Alexander S. Volpin
INVENTOR.

BY

ATTORNEY

United States Patent Office 3,348,567
Patented Oct. 24, 1967

3,348,567
COMPOUND PRESSURE SEALANT-
SEALED VALVE
Alexander S. Volpin, 10200 W. Broadview Drive,
Miami Beach, Fla. 33154
Filed Jan. 4, 1965, Ser. No. 423,271
19 Claims. (Cl. 137—246.12)

ABSTRACT OF THE DISCLOSURE

A valve of the automatic lubricant-sealed type which employs a dual-reservoir sealant supply system for each of the sealing grooves, the system including a primary reservoir in a valve seat and defined in part by a movable wall responsive to pressure differentials in the valve to expel sealant into the sealing grooves, and a storage reservoir also responsive to pressure differentials in the valve to automatically replenish sealant in the primary reservoir.

---

This invention relates to valves of the automatic plastic sealant-sealed type, and more particularly to automatic sealed gate valves of the through-conduit type.

In the now more conventional forms of automatic sealant-sealed valves, plastic sealant material is fed from a reservoir to a sealing groove system arranged between the adjacent surfaces of the closure member and the seats. The movement of the sealant is automatic in response to the differential in pressure between the upstream and downstream line pressures when the closure member is moved to the closed position, the differential pressure being applied to a slidable barrier or piston positioned in the reservoir to displace the sealant therefrom to the sealing groove system.

The automatic sealing systems as presently provided in such valves are required to function on relatively small pressure differentials, with the result that friction losses in the relatively movable parts and by reason of the usually highly-viscous character of the sealant may often reduce the effective differential to the point that the flow of sealant is greatly slowed or reduced with the result that the sealing may be incomplete.

Accordingly, it is a primary object of the present invention to provide improvements in automatic sealed valves of the general character described which greatly increase the pressure differentials effective upon sealant-moving elements of the valve.

A principal object is to provide a pressure-compounding system for moving sealant into the sealing groove systems of valves of the automatic sealing type.

An important object is to provide a dual-sealant reservoir arrangement which includes the more conventional reservoir system responsive to the usual pressure-differentials, but functioning primarily as a storage or back-up reservoir for a primary supply reservoir which is constructed and arranged to develop substantially greater pressure differentials for expelling sealant therefrom to the sealing groove system of the valve.

A further object is the provision of the dual-sealant reservoir system in which the primary reservoir is an expansible chamber defined in part by a movable seat member which when the closure member moves to the seat-closing position, is arranged to function effectively as a relatively large area piston developing a correspondingly large differential pressure for expelling sealant from the chamber to the sealing groove system of the valve.

A more specific object is the provision of a unitary seat construction which, in addition to defining the movable wall of the primary sealant reservoir, has mounted therein the storage or back-up reservoir system.

Yet another object is the provision of a dual-reservoir system as described in which the reservoirs are connected by suitably valved passages, operable to permit replenishment of sealant in the primary reservoirs when the closure member of the valve is moved to the valve-opening position.

Still another obect is the provision in the gate valve of the character described of improved metal-to-metal sealing structures for allowing re-packing of the valve stem under pressure in both the open and closed positions of the gate member.

Yet additional objects include the provision in valves of the character described of improved guidance arrangements for the gate member; improved means for connecting the gate stem to the gate member to permit lateral shifting of the later; and flexible conduit means for supplying sealant from the exterior of the valve to the reservoirs.

Other and more specific objects and advantages of this invention will become more readily apparent from the following detailed description when read in conjunction with the accompanying drawing which illustrates several useful embodiments in accordance with the present invention.

The valve, in accordance with the embodiment illustrated in FIGS. 1 to 10, inclusive, is of the through-conduit, non-rising stem, gate type, comprises a valve housing or body 10 having opposed flow ports 11—11 forming the flowway 12 which is intersected interiorly of the housing by the gate chamber 13. The upper end of chamber 13 is closed by means of a tubular bonnet 14 having a closure flange 15 at its lower end by which the bonnet may be removably secured to the upper end of housing 10 by means of the studs 16.

Bonnet 14 has an axial stem-receiving bore 17 terminating at its lower end in a downwardly facing bevelled shoulder defining a seat 18. Bore 17 is reduced slightly in diameter near its upper end to define an internal downwardly facing bevelled shoulder forming the seat 19. The bore of the bonnet is enlarged above seat 19 to define a stuffing box 20 which is adapted to be closed by a cap 21 threadedly received over the upper end of bonnet 14.

The inner end of each flow port 11 is provided with an inwardly extending annular boss 22 bounded by inner and outer cylindrical walls 23 and 24, respectively. The bore of boss 22 bounded by inner wall 23 is larger in diameter than the bore of flowway 12, thereby forming an inwardly facing annular shoulder 24a. Inner wall 23 and shoulder 24a define an annular recess 25 to slidably receive an annular gate seat 26 for coaxial movement therein. Gate seat 26 has an axial bore 27 registering with flowway 12 and generally of the same diameter to provide full open flow therethrough. As the gate seats and their appurtenances are identical in construction and are arranged symmetrically on opposite sides of the gate chamber, the description of one will, it will be understood, be applicable to both.

Figure 1:
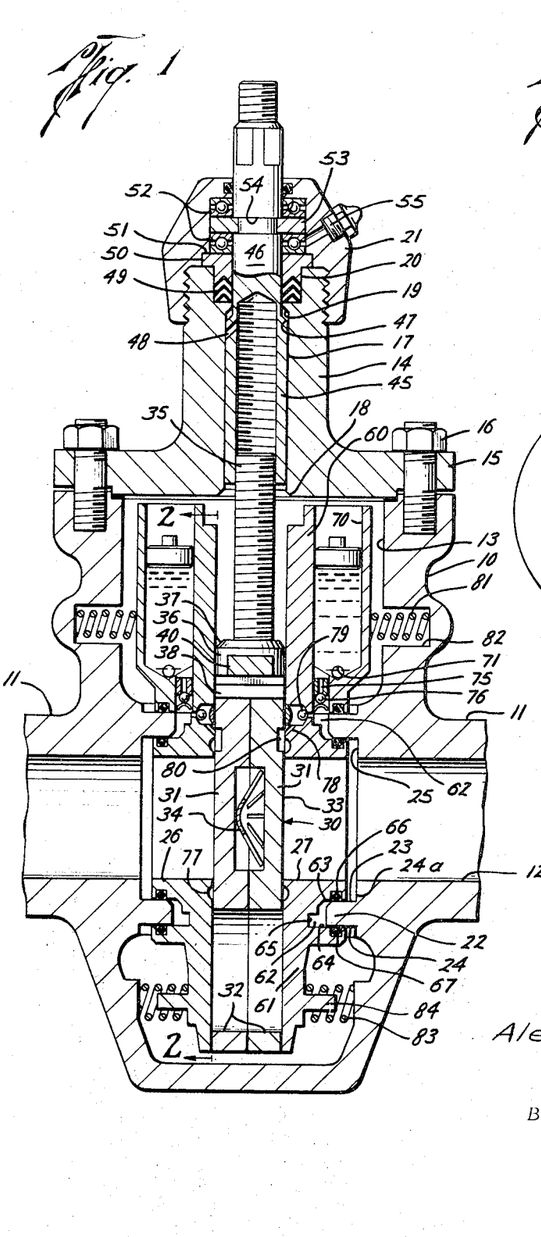
FIG. 1 is a longitudinal, vertical sectional view of a valve in accordance with one embodiment of the present invention, the parts being shown in the non-pressured closed position of the valve.
Figure 2:
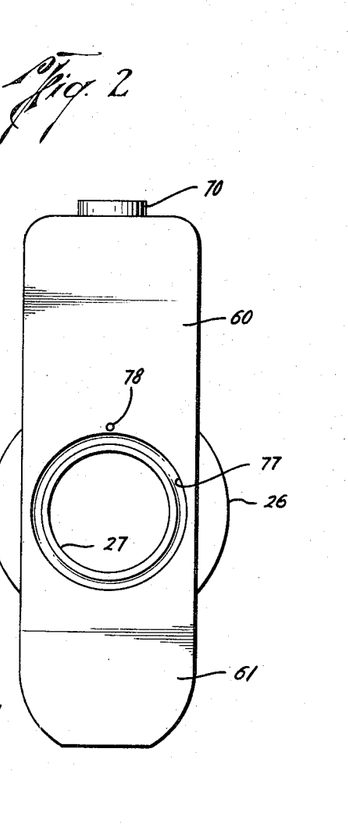
FIG. 2 is an elevational view of the gate-engaging face of one of the seat members as viewed generally along line 2—2 of FIG. 1.
Figures 3, 4:
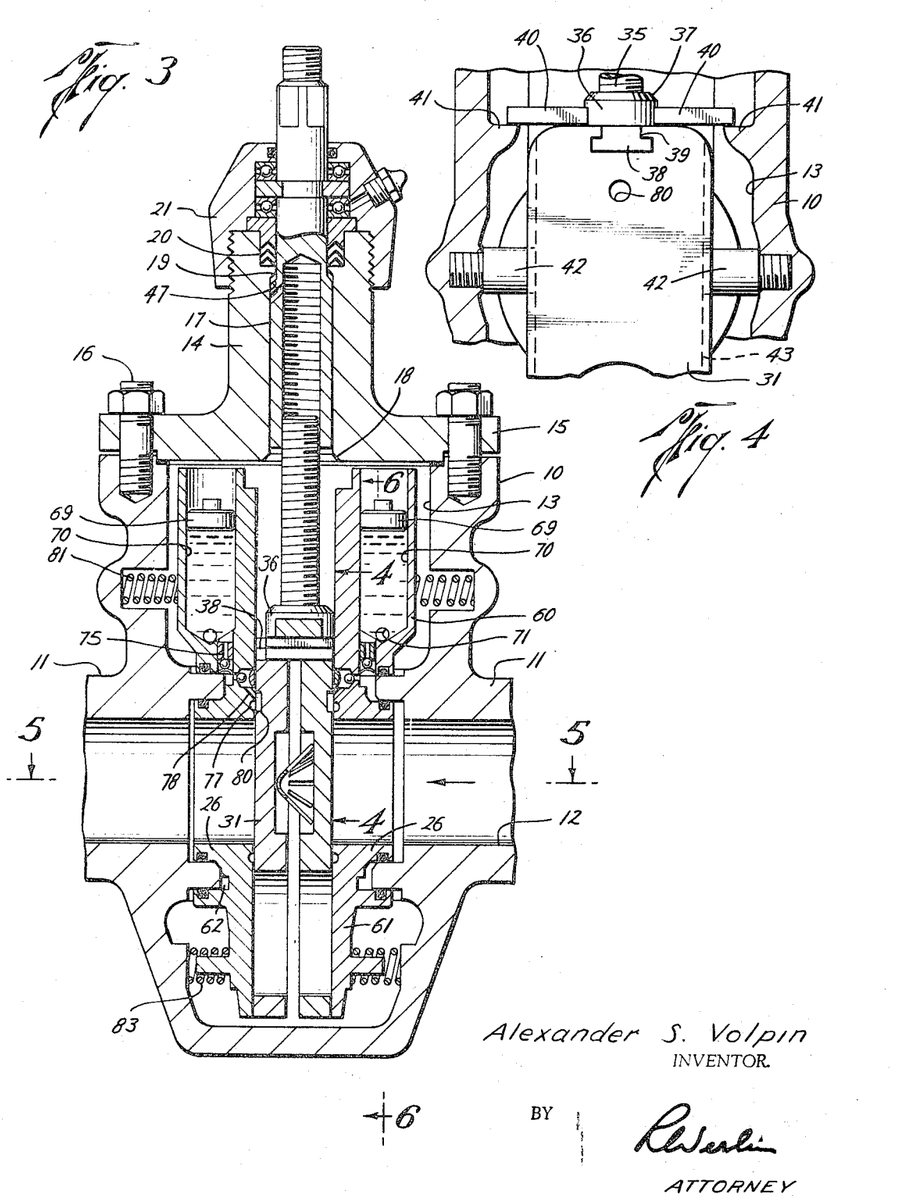
FIG. 3 is a view similar to FIG. 1 showing the valve parts in the closed position and under upstream line pressure.
FIG. 4 is a fragmentary view, partly in section and partly in elevational view of the gate member and operating stem connected thereto, as viewed generally along line 4—4 of FIG. 3.
Figures 8, 9, 10:
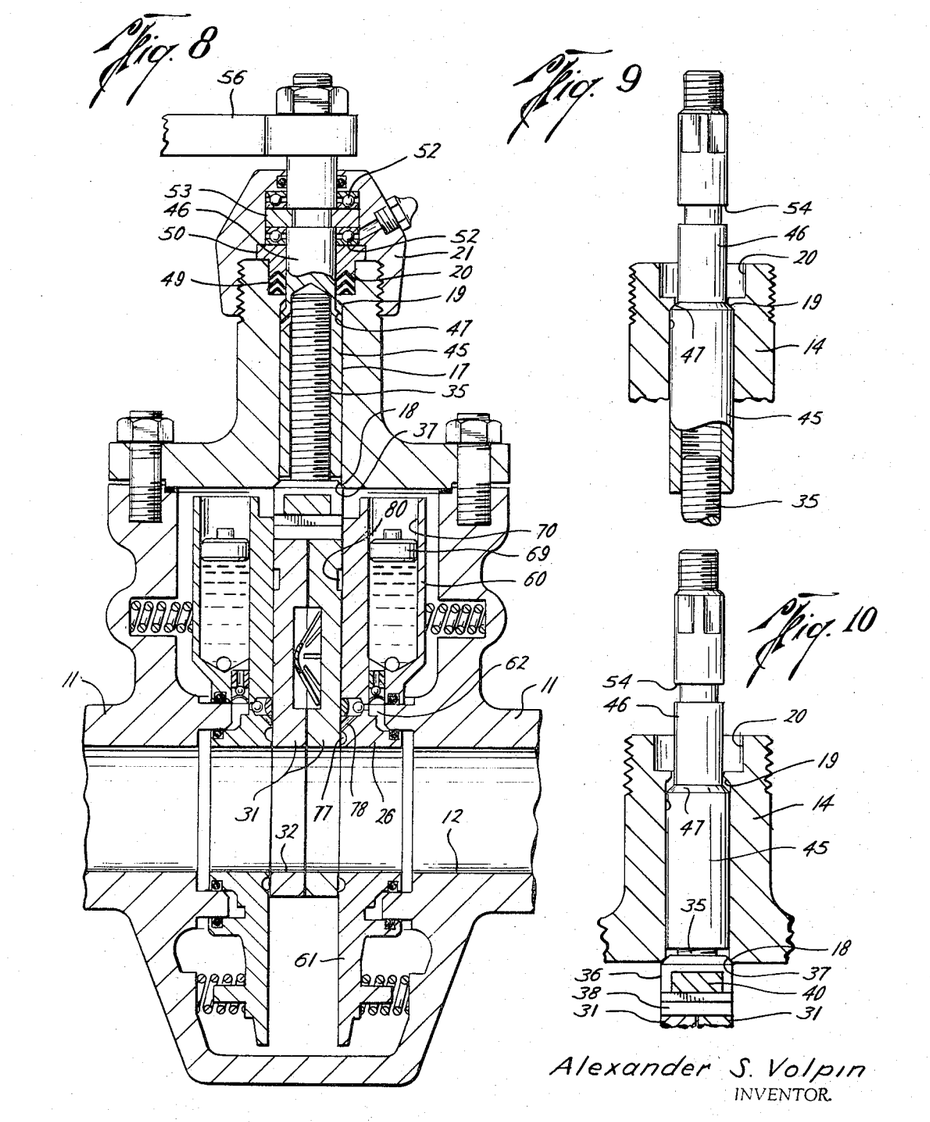
FIG. 8 is a view generally similar to FIGS. 1 and 3, but showing the parts in the open position of the valve.
FIG. 9 is a fragmentary view of the operating stem elements illustrating the metal-to-metal seal effective when the valve is in the closed position.
FIG. 10 is a view similar to FIG. 9 showing the metal-to-metal seal effective when the valve is in the open position.

A gate, designated generally by the numeral 30, is disposed in chamber 13 for vertical reciprocation across flowway 12 between gate seats 26—26. Gate 30 is constructed of a pair of mating, generally rectangular gate segments 31—31 having flat outer faces adapted for slidable engagement with the inner end faces of seats 26—26. The gate is provided near its lower end with a transverse flow port 32, defined by registering openings in the gate segments, and adapted to register with flowway 12 when the gate is in the raised or flowway-opening position, as seen in FIG. 8. The upper portions of the gate segments form the closure section 33 which is adapted to cut off flow through flowway 12 when the gate is in the lower or flowway-closing position, as seen in FIGS. 1 and 3. A spring washer 34, such as a conventional Bellville washer, is mounted between the adjacent inner faces of gate segments 31—31 to resiliently bias the segments apart and toward the opposed gate seats.

Gate 30 is reciprocated by means of an externally threaded lower stem member 35 terminating at its lower end in an annular enlargement 36, defining an upwardly facing annular shoulder 37 surrounding the lower end of stem member 35. Shoulder 37 is bevelled to cooperate with seat 18 to form a metal-to-metal seal therewith as will be described subsequently. As best seen in FIG. 4, stem member 35 is connected to gate 30 by means of an inverted T-shaped head 38 which projects below enlargement 36 and is slidably received in a correspondingly shaped slot 39 provided transversely across the upper ends of gate segments 31—31. By means of this connection the gate may move laterally relative to stem member 35, as seen in FIG. 3, thus affording movement of the gate in two planes substantially normal to each other, for purposes to be described hereinafter. Enlargement 36 carries a pair of lateral arms 40—40 extending from opposite sides thereof transversely of the gate chamber so that the ends of the arms are positioned to abut against upwardly facing bosses 41—41 mounted on the opposite walls of the gate chamber, bosses 41—41 being adapted to form stops positioned to limit downward movement of the gate to the full flowway-closing position shown in FIGS. 1 and 3, while holding the lower ends of the gate segments clear of the bottom wall of the valve housing.

Figures 5, 6, 7:
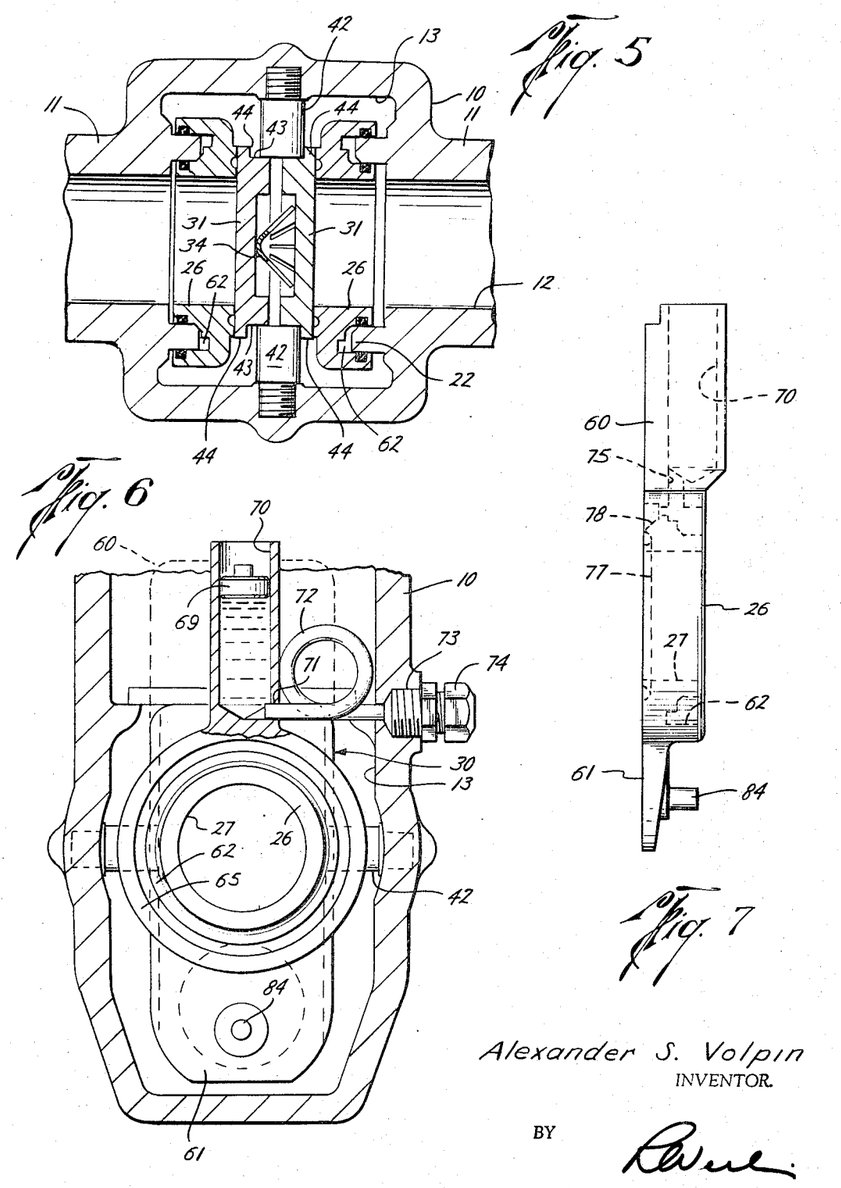
FIG. 5 is a transverse, cross-sectional view taken generally along line 5—5 of FIG. 3.
FIG. 6 is a partly sectional, partly elevational view taken generally along line 6—6 of FIG. 3.
FIG. 7 is a side elevational view of one of the seat members.

As best seen in FIGS. 4 and 5, gate segments 31 are guided in their reciprocating movement by a pair of cylindrical guide studs 42—42 screwed into the opposite side walls of gate chamber 13 and dimensioned to extend into longitudinal grooves 43—43 provided in the longitudinal side edges of the gate segments, each groove defining a pair of spaced-apart side walls 44—44 cooperating with studs 42—42 to limit inward movement of the gate segments while permitting outward movement thereof for purposes which will appear subsequently.

Lower stem member 35 is reciprocated by means of an upper stem member comprising an internally threaded drive sleeve 45 which threadedly receives lower stem member 35 and is rotatably mounted in bore 17 of the valve bonnet. The upper end portion of sleeve 45 carries a generally cylindrical solid extension 46 reduced in external diameter to define the upwardly facing bevelled shoulder 47 adapted to cooperate with seat shoulder 19 to provide a metal-to-metal seal therebetween. A relief port 48 is provided through the wall of sleeve 45 at a point just below shoulder 47 communicating the bore of sleeve 45 with bore 17 of the bonnet to prevent entrapment of fluid in the bore of the drive sleeve during relative movement of member 35 therein.

Stem extension 46 extends upwardly through stuffing box 20 which contains packing 49 to seal about the extension. Packing 49 is compressed about the stem extension by means of a gland 50 which is urged against the packing by a shoulder 51 inside cap 21 when the latter is screwed down over the bonnet. A pair of anti-friction bearings 52—52 are mounted in cap 21 about stem extension 46 above and below a split spacer collar 53 seated in an annular groove 54 provided in the stem extension. A pressure grease fitting 55 is mounted in cap 21 to permit injection of lubricant to the interior of the cap for lubricating bearings 52—52. The upper end of stem extension 46 projects through the upper end of cap 21 and is provided with the usual flats and threaded portions for connection of a suitable and generally conventional manual or mechanical operator 56, a part of which is shown in FIG. 8.

Although with the stem construction described, the valve is of the type commonly designated as a non-rising stem gate valve, it should be understood that the automatic sealing features hereinafter described are applicable as well to so-called rising-stem valves.

In the seat construction exemplified in FIGS. 1 to 10, inclusive, seat 26 is integrally formed with generally rectangular upward and downward extensions 60 and 61, respectively, the inner or forward faces of which are flush with the gate-engaging face of seat 26 and present therewith to the opposed gate face a generally flat surface of the same general size and shape as the gate and which has the useful function of acting as a wiping surface for the gate faces as the gate is reciprocated, so that the latter will be kept wiped clean of foreign matter and other detritus which otherwise might tend to collect thereon during operation of the valve.

The outer or rearward end of gate seat 26 is provided with an annular recess adapted to slidably fit about boss 22 and defined by concentric inner and outer walls 63 and 64, respectively, and a bottom wall 65. The depth of the recess is made greater than the length of boss 22 so that the recess will provide a space between bottom wall 65 and the forward end of boss 22 defining an annular chamber 62 therebetween which will function as the primary sealant reservoir for the valve, which will be expansible and retractable in accordance with the axial movement of the gate seat, as will appear presently. An O-ring seal 66 is sealingly disposed between inner wall 63 and inner wall 23 of boss 22, and a second O-ring seal 67 is sealingly disposed between outer wall 64 of the recess and outer wall 24 of the boss.

The rear portion of upper extension 60 is bored out from its upper end to provide the sealant reservoir 70. A port 71 is provided through the wall of reservoir 70 near its lower end and is connected to a flexible conduit 72 (see FIG. 6) which communicates through a threaded socket 73 in the wall of housing 10 with a pressure grease fitting 74 by means of which plastic sealant, such as heavy grease or the like, may be injected into reservoir 70. The latter functions as the back-up supply reservoir for primary reservoir 62, being connected thereto by a passageway 75 in which is mounted a check valve 76 operative to permit flow of sealant from reservoir 70 to reservoir 62 while preventing back-flow toward reservoir 70. A piston or slidable barrier 69 is positioned in reservoir 70 to urge sealant toward reservoir 62 in response to appropriate pressure differentials as will appear subsequently.

The sealing groove system for the gate seat includes an annular groove 77 provided in the inner or forward end of the gate seat surrounding bore 27 thereof. A passageway 78 extends through the body of the gate seat and communicates the interior of reservoir 62 with the outer face of the gate seat at a point spaced a short distance from groove 77. A check valve 79 is mounted in passageway 78 and is arranged therein to permit flow of sealant out of reservoir 62 toward groove 77 while preventing back-flow toward the reservoir. A jumper recess 80 is provided in the outer surface of closure portion 33 of gate segment 31 and is positioned therein to communicate the outer end of passageway 78 with groove 77 when the gate is in the flowway-closing position (FIGS. 1 and 3) and to cut off sealant flow to the groove upon the first movement of the gate in the flowway-opening direction (FIG. 8).

Each gate seat is resiliently biased toward the opposed face of the adjacent gate segment by springs mounted at convenient points between the gate seat extensions and the walls of housing 10. In the presently described embodiment, a coil spring 81 is seated in compression between the outer face of upper gate extension 60 and the wall of gate chamber 13, one end of the spring bearing against the back-side of the extension, and the other end seated in a socket 82 in the wall of housing 10. A second coil spring 83 is mounted in compression between lower gate extension 61 and an opposite portion of the housing wall. One end of spring 83 is seated about an outwardly projecting boss 84 on the rear face of extension 61, and the other end bears against the housing wall.

In operation the valve functions in the following manner: With the gate moved to the closed position, shown in FIG. 3, it will be seen that upstream pressure from the right-hand direction, as indicated by the arrow, will act on the upstream side of the gate and the upstream gate seat urging both to the left against the resistance afforded by spring washer 34 and coil springs 81 and 83 positioned between the left-hand gate member and the housing wall. The left-hand movement of the upstream segment of the gate will be stopped by engagement with guide studs 42, as seen in FIG. 5, but the left-hand movement of the downstream segment of the gate and the seat in contact therewith will continue in response to the pressure differential across the valve, the gate segments being spread slightly apart, as indicated in FIGS. 3 and 5. The upstream line pressure will thus be exerted against a very large area comprising the full cross section of the gate seat 26, as contrasted with the much smaller annular area defined by the downstream end of the gate seat acted on by the downstream pressure. The resulting high differential in pressure forces between the upstream and downstream sides of the left-hand gate segment will, therefore, act on the movable wall defined by bottom wall 65 which will, in turn, compress the sealant contained in the downstream primary reservoir 62 forcing the sealant out of this reservoir through passageway 78 into jumper recess 80 from which the sealant flows into sealing groove 77 on the downstream side of the gate. The high differential thus occasioned by the application of the upstream pressure to the very large area of the gate seat will necessarily overcome any friction or other losses in the passages and will produce rapid discharge of the sealant from reservoir 62 into the sealing groove so as to fill the latter almost instantly upon movement of the gate to the flowway-closing position.

It will be understood that the dimensions of reservoir 62 will be made such that the reservoir will contain at least as much sealant as may be required to completely fill sealing groove 77. Reservoir 70 will retain an auxiliary supply of sealant to be automatically discharged into reservoir 62 to re-fill the latter whenever the gate has been moved to the flowway-opening position. In the latter case, the pressures will become balanced so that the pressure of springs 81 and 83 on the downstream side of the gate will urge the entire seat member and the left-hand gate segment to the right to attain a balanced position, such as shown in FIG. 8. This right-hand movement of the gate seat will create a slight vacuum in reservoir 62 by reason of the resulting expansion of the reservoir and will thereby create a pressure differential across reservoir 70 by reason of the slightly higher pressure then existing in the gate chamber. This differential, although small, will then act on barrier 69 forcing it downwardly to displace sealant from reservoir 70 through passageway 75 into reservoir 62, thereby re-filling the latter in preparation for the next requirement occasioned by a subsequent closing of the valve.

It will be understood, of course, that the duplicate sealing systems installed on both sides of the valve, as described, are provided for the purpose of making the valve completely symmetrical so that it may be installed in a pipe line with either side the upstream or downstream side. It will be evident also that during operation of the valve the upstream reservoirs will be relatively inactive insofar as sealing of the valve is concerned.

In addition to the superior sealing functions of the valve in the embodiment heretofore described, the valve also incorporates some important features for permitting re-packing of the valve stem, both when the valve is in the open position and when it is in the closed position. When the valve is in the closed position, illustrated in FIG. 3, and it is desired to re-pack the valve stem while the valve is under pressure, cap 21 will be unscrewed one or two turns and drive sleeve 45 then may be turned to the right in the direction normally urging the gate to the closed position. However, as the latter has already attained that position, the resultant effect will be to cause the drive sleeve to move upwardly, this upward movement continuing until shoulder 47 has come in contact with seat shoulder 19, as best seen in FIG. 9, wherein cap 21, packing 49 and the bearing elements have all been removed for purposes of better illustration. The resultant metal-to-metal seal thus afforded between shoulders 19 and 47 will prevent any leakage from the valve while the cap is completely removed, along with bearings 51, 52, split collar 53 and gland 50, thereby exposing stuffing box 20 and permitting replacement of or adding to packing 49. When the re-packing has been completed, cap 21 and the parts enclosed thereby will be replaced and the valve returned to its normal condition by one or two turns of the drive sleeve.

To re-pack the valve under pressure when in the open position, the position shown in FIG. 8, it will be seen that retraction of the gate to the fully opened position will bring shoulder 37 into metal-to-metal sealing contact with seat shoulder 18 at the lower end of bore 17 of the bonnet. This metal-to-metal seal will be sufficiently tight to prevent leakage while cap 21 is removed for purposes of re-packing the valve. The positions of the sealing shoulder and the gate stem parts are shown in FIG. 10.

Accordingly, it will be seen that the particular stem construction herein described in cooperation with the related parts of the valve structure, provide highly effective metal-to-metal seals which enables the valve to be re-packed under pressure either in the open or closed position, thus providing a very useful improvement in valves of this general type.

FIGS. 11 to 14 illustrate a modification of the valve previously described, differing primarily in that the auxiliary sealant reservoirs, corresponding to reservoirs 70, are integral with the valve housing and separate from the gate seats. As illustrated, the modified valve construction includes a housing 110 having removable flow nozzles 111—111 screwed into suitably threaded openings provided at the opposite ends of the valve housing and having coaxial ports defining the flowway 112 through the valve. The latter is intersected interiorly of the housing by the gate chamber 113, the upper end of which is closed by means of a tubular bonnet 114 having a closure flange 115 at its lower end by which the bonnet may be removably secured to the upper end of housing 110 by means of the studs 116. Bonnet 114 has an axial stem-receiving bore 117 terminating at its lower end in the downwardly facing bevelled seat 118, and, although not shown, it will be understood that the construction of the upper portion of bore 117 is in all respects like that in the previously described embodiment.

Each of the flow nozzles 111 is counterbored from its inner end to form at the bottom thereof an annular recess 162 defined between a forwardly extending outer wall 164 and a shorter forwardly extending inner annular boss 122, recess 162 forming the primary expansible sealant reservoir for the valve. Boss 122 is additionally counterbored to provide a second counterbore 124 which terminates in an annular bottom wall or shoulder 163 surrounding flowway 112. An annular gate seat 126 is slidably disposed in the first counterbore and has a rearwardly extending reduced diameter tubular neck 127 slidably received in second counterbore 124. The reduction in diameter in the gate seat to define neck 127 defines the annular shoulder 125 which is adapted to abut the forward end of boss 122 when the seat is fully retracted. A coil spring 182 is mounted in compression between the outer end of neck 127 and shoulder 163 to bias the gate seat inwardly of the gate chamber. An O-ring seal 166 is provided between the exterior of seat 126 and wall 164 and a second O-ring seal 167 is provided between neck 127 and the wall of counterbore 124.

Figures 11, 12:
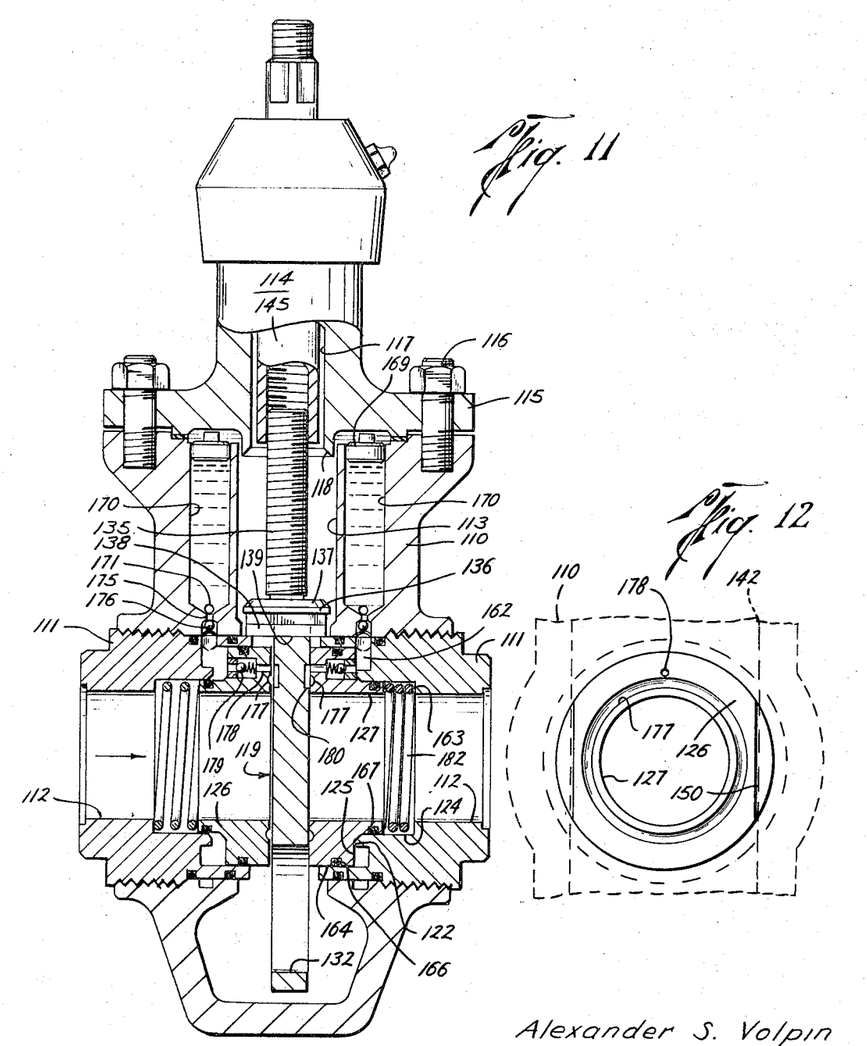
FIG. 11 is a longitudinal, vertical cross-sectional view of a gate valve in accordance with another embodiment of this invention, the valve being shown in the closed position.
FIG. 12 is a fragmentary elevational view of the forward seat face.
Figures 13, 14:
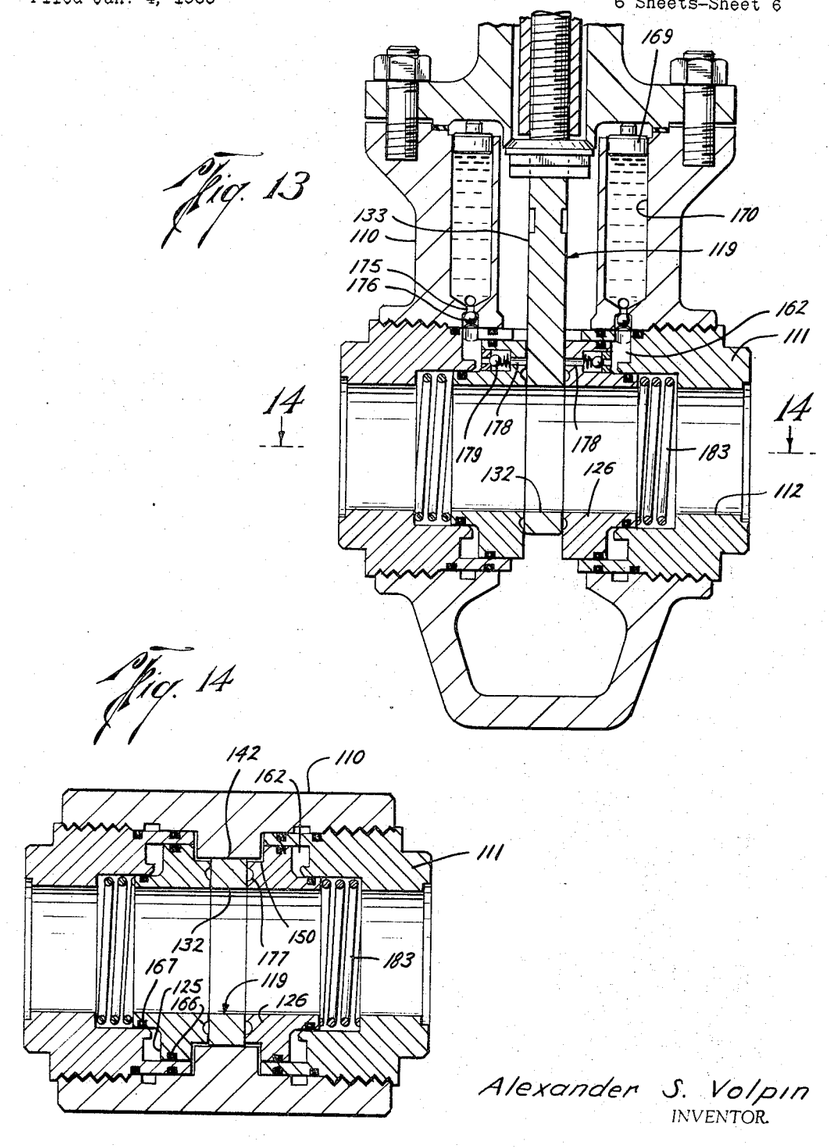
FIG. 13 is a view generally similar to FIG. 11 showing the valve in the open position.
FIG. 14 is a transverse, cross-sectional view taken generally along line 14—14 of FIG. 13.

A gate, designated generally by the numeral 119, is disposed in chamber 113 for vertical reciprocation across flowway 112 between gate seats 126—126. Gate 119 is of one piece, generally rectangular, flat-sided construction, the side faces being slidably engageable with the inner end faces of gate seats 126—126. The gate is provided near its lower end with a transverse flow port 132 adapted to register with flowway 112 when the gate is in the raised or open position, as seen in FIG. 13. The upper portion of the gate forms the closure section 133 which is adapted to cut off flow through flowway 112 when the gate is in the lower or flowway-closing position, as seen in FIG. 11. The stem construction is substantially like that of the previously described embodiment including an externally threaded lower stem section 135 terminating at its lower end in an annular enlargement 136 having an upwardly facing bevelled shoulder 137 for engaging seat 118 in metal-to-metal sealing engagement when the gate is moved to the flowway-opening position. As in the previously described embodiment annular enlargement 136 carries a downwardly projecting inverted T-shaped head 138 slidably received in a correspondingly shaped slot 139 extending transversely of the upper end of the gate whereby to permit lateral movement of the gate relative to the gate stem. Although not shown, it will be understood that enlargement 136 may carry laterally extending arms for engaging bosses, such as bosses 41 of the previously described embodiment, to limit downward movement of the gate to attainment of its fully closed position. Also the gate stem will include a drive sleeve 145 and related parts identical in substantially all respects with the corresponding parts of the first-described embodiment.

As best seen in FIGS. 12 and 14, the gate is guided in its reciprocating movement by a pair of bosses 142 of generally rectangular cross-section formed on opposite sides of the wall of the gate chamber to project inwardly, so as to slidably engage the longitudinal edges of the gate. The forward ends of the gate seats are cut-away on opposite sides thereof to form the notches 150 which are shaped to slidably engage the adjacent longitudinally extending corners of bosses 142. The engagement between notches 150 and the corners of bosses 142 serve two purposes: One to prevent rotation of the seats in order to maintain the proper alignment of the sealing grooves therein with the sealant supply passages, as will appear later; and second, to limit inward movement of the gate seats during operation under pressure, as will also appear subsequently. A pair of sealant reservoirs 170 are formed in the wall of housing 110, there being one of the reservoirs for each side of the valve for supplying each sealing groove system. A port 171 is provided through the wall of reservoir 170 near its lower end for injecting sealant into the reservoir from an external supply fitting through a flexible conduit like that illustrated and described previously in connection with the earlier embodiment. A passageway 175 connects the lower end of supply reservoir 170 to reservoir 162. A check valve 176 is mounted in passageway 175 to permit flow of sealant from reservoir 170 toward reservoir 162, while preventing back-flow toward reservoir 170. A piston or slidable barrier 169 is positioned in reservoir 170 to urge the sealant toward reservoir 162 in response to appropriate pressure differentials between the reservoirs, in the same manner as previously described.

The sealing groove system for the gate includes an annular groove 177 provided in the inner or forward end of the gate seat surrounding bore 127 thereof. A passageway 178 extends through the body of gate seat 126 and communicates the interior of reservoir 162 with the outer face of the gate seat at a point spaced a short distance from groove 177. A check valve 179 is mounted in passageway 178 and is arranged therein to permit flow of sealant out of reservoir 162 toward groove 177, while preventing back flow toward reservoir 162. A jumper recess 180 is provided in the outer surface of the closure portion 133 of the gate and is positioned therein to communicate the outer end of passageway 178 with groove 177 when the gate is in the flowway-closing position (FIG. 11) and to cut off sealant flow to the groove upon the first movement of the gate in the flowway-opening direction.

In operation, the valve functions very much like the previously described embodiment. With the flow in the direction indicated by the arrow in FIG. 11, and the gate moved to the flowway-closing position, the upstream pressure will act on the upstream side of the gate and thence against the downstream gate seat urging both in the right-hand or downstream direction against the resistance afforded by spring 182. The movement of the seat in the downstream direction thus produced will move the seat inwardly of reservoir 162 and will thereby compress the sealant in reservoir 162 forcing the latter outwardly through passageway 178 via jumper recess 180 into sealing groove 177. In this instance also, the effective area exposed to the upstream pressure will be quite large as compared with the effective area exposed to the downstream pressure, thereby creating the high differential pressure which will produce rapid filling of the downstream sealing groove.

When the gate is moved to the open position, illustrated in FIG. 13, and the pressures inside the housing become generally balanced, the previously retracted gate seat will be moved outwardly under the urging of spring 183 and this outward movement will create the vacuum in recess 162, as previously described, which will, in turn, provide the pressure differential acting on barrier 169 in the downward direction to urge sealant out of reservoir 170 into reservoir 162.

Thus it will be seen that the embodiment shown in FIGS. 11 to 14 operates in the same way as the previously described embodiment, and is also provided with the metal-to-metal seals of the earlier described embodiment, enabling re-packing of the valve while under pressure and either in the open or closed position.

It will be understood that various other changes and alterations may be made in the details of the illustrative embodiments within the scope of the appended claims but without departing from the spirit of this invention.

What I claim and desire to secure by Letters Patent is:

1. In a valve including a housing having a flow port, an operable closure for the flow port arranged for limited lateral movement relative to the flow port, a closure seat slidably disposed about the flow port, a sealant groove arranged between the closure and said seat about said flow port, an expansible sealant reservoir in the housing having a movable wall portion defined by said seat, passage means connecting said reservoir with said groove, means biasing said seat toward the closure in the reservoir-expanding direction, means including said seat and said closure operable in response to line pressure when the closure is in flow port-closing position to move said seat in the reservoir-contracting direction whereby to force sealant from said reservoir to said groove, and means including a second sealant reservoir in said housing and responsive to line pressure communicating with said expansible reservoir to replenish sealant therein and in said groove.

2. In a valve including a housing having a flow port, an operable closure for the flow port arranged for limited lateral movement relative to the flow port, a closure seat slidably disposed about the flow port, a sealant groove arranged between the closure and said seat about said flow port, an expansible sealant reservoir in the housing having a movable wall portion defined by said seat, passage means connecting said reservoir with said groove, means biasing said seat toward the closure in the reservoir-expanding direction, and means including said seat and said closure operable in response to line pressure when the closure is in flow port-closing position to move said seat in the reservoir-contracting direction whereby to force sealant from said reservoir to said groove, and sealant supply means in said housing communicating with said expansible reservoir and operable automatically to deliver sealant thereto in response to line pressure when the closure is moved to the flow port opening-position.

3. In a valve according to claim 2 wherein said sealant supply means includes a second sealant reservoir, means for introducing sealant therein, and a slidable barrier in said second reservoir exposed to line pressure.

4. A valve including a housing having a flowway therethrough, a closure member in the housing intersecting the flowway and arranged for limited lateral movement parallel thereto, a closure seat member slidably disposed about said flowway, a portion of said seat member cooperating with an adjacent housing portion to define therewith an expansible sealant reservoir, a sealant groove arranged between the closure member and the seat member about the flowway, passage means communicating said reservoir with said sealant groove, means biasing the seat member toward the closure member and in the reservoir-expanding direction, said seat member and said closure member when the latter is in flowway-closing position forming means operable in response to upstream line pressure to move said seat member in the reservoir-contracting direction whereby to force sealant from said reservoir to said sealant groove, and sealant supply means disposed in said housing in communication with said expansible reservoir and operable to deliver sealant to said expansible reservoir in response to the differential in pressure between that in said housing and that in said expansible reservoir resulting upon movement of the closure member to the flowway-opening position.

5. A valve according to claim 4 wherein said sealant supply means includes a second sealant reservoir, a passageway connecting said second reservoir to said expansible reservoir, means for introducing sealant into said second reservoir, and a slidable barrier in said second reservoir exposed to line pressure.

6. In a valve according to claim 5, first and second check valve means positioned in said passage means and in said passageway to permit outflow only of sealant from the related reservoirs.

7. A valve including a housing having a flowway therethrough, a flat-sided gate in the housing reciprocable across the flowway and arranged for limited lateral movement parallel thereto, an annular seat member slidably disposed about said flowway and having a gate-engaging face on the forward end thereof, a rearward portion of said seat member forming a movable wall cooperating with an adjacent housing portion to define therewith an expansible sealant reservoir, a sealant groove arranged about the flowway between the gate-engaging face of the seat member and the opposed side of said gate, passage means communicating said reservoir with said sealant groove, resilient means biasing the seat member toward the gate and in the reservoir-expanding direction, said seat member and said gate when the latter is in flowway-closing position forming means operable in response to line pressure to move said rearward portion of said seat member in the reservoir-contracting direction whereby to force sealant from said reservoir to said sealant groove, and sealant supply means disposed in said housing in communication with said expansible reservoir and operable to deliver sealant to said expansible reservoir in response to pressure differentials between the pressures in said housing and in said expansible reservoir resulting upon movement of the gate to the flowway-opening position.

8. A valve according to claim 7 wherein said movable wall has an annular configuration and defines a pressure-actuatable area less than that of said gate-engaging face.

9. In a valve including a housing having a pair of flow ports defining a flowway through the housing, an operable closure for the flowway arranged for limited lateral movement between the flow ports, a closure seat slidably disposed about each flow port, a sealant groove arranged between the closure and each seat about the related flow port, an expansible sealant reservoir in the housing for supplying each seat, each reservoir having a movable wall portion defined by the related seat, passage means connecting each reservoir with a related sealant groove, means biasing said seats toward the closure in the reservoir-expanding direction, means including one of said seats and said closure operable in response to line pressure when the closure is in flow port-closing position to move said seat in the reservoir-contracting direction whereby to force sealant from said reservoir to said groove, and means including a second sealant reservoir in said housing and responsive to line pressure communicating with said expansible reservoir to replenish sealant therein and in said groove.

10. In a valve including a housing having a pair of flow ports defining a flowway through the housing, an operable closure for the flowway arranged for limited lateral movement between the flow ports, a closure seat slidably disposed about each flow port, a sealant groove arranged between the closure and each seat about the related flow port, an expansible sealant reservoir in the housing for supplying each seat, each reservoir having a movable wall portion defined by the related seat, passage means connecting each reservoir with a related sealant groove, means biasing said seats toward the closure in the reservoir-expanding direction, means including one of said seats and said closure operable in response to line pressure when the closure is in flow port-closing position to move said seat in the reservoir-contracting direction whereby to force sealant from said reservoir to said groove, and separate sealant supply means in said housing communicating with each of said expansible reservoirs and operable to automatically deliver sealant thereto in response to line pressure when the closure is moved to the flowway-opening position.

11. In a valve according to claim 10 wherein each of said sealant supply means includes a sealant supply reservoir, a passageway connecting said supply reservoir to the related expansible reservoir, means for introducing sealant into said supply reservoirs, and a slidable barrier in each supply reservoir exposed to line pressure.

12. In a valve according to claim 10 wherein said closure is a generally rectangular gate having flat surfaced side faces engageable with said seats.

13. A valve according to claim 11 wherein said supply reservoirs are integral with said seats.

14. A valve according to claim 10 wherein said movable wall portion defines a pressure-actuatable area less than that of the closure-engaging face of said seat.

15. In a sealant sealed valve, a housing having a flow port, a two-sided closure therefor movable in at least two planes relative to the flow port, a closure seat slidably mounted about said flow port and normally resiliently urged against said closure, sealant sealing faces disposed between each side of said closure and seat, a pair of sealant reservoirs in communication with said faces, means responsive to line pressure when the closure is in flow port-closing position imparting movement to said seat whereby sealant is forced from one of said reservoirs to said sealing faces, and additional sealant reservoir means interiorly of said housing responsive to line pressure to automatically transfer a supply of sealant therefrom to said one reservoir.

16. In a valve having a flow port, an operable closure therefor mounted for limited lateral movement relative to the flow port, a closure seat slidably mounted about said flow port, a sealant groove about said closure and said seat, a sealant reservoir connected by passage means with said groove, means to slide said seat toward said closure, means including said closure and responsive to line pressure when the closure is in the flow port-closing position to cause said seat to undergo a reverse sliding movement whereby sealant is forced from said reservoir to said groove, a sealant supply reservoir connected to said sealant reservoir, and means responsive to line pressure when said closure is moved to the flow port-opening position to force sealant from said supply reservoir to said sealant reservoir.

17. In a sealant sealed valve, a valve housing, a chamber therein, flow ports intersecting said chamber, an operable flow port closure in said chamber, upstream and downstream seats slidably mounted about said flow ports, resilient means urging said seats against said closure, means permitting limited axial closure movement in a direction toward said seats, sealant sealing faces between said seats and closure, a pair of sealant reservoirs disposed adjacent each said seat, means communicating each said sealing face with one of said reservoirs whereby the force of upstream line pressure will impart axial movement to said closure and downstream seat thereby forcing sealant from the downstream reservoir to the downstream sealing faces and additional sealant reservoir means interiorly of said housing responsive to line pressure to automatically transfer a supply of sealant therefrom to said one reservoir.

18. In a sealant sealed valve, a housing having a flow port, a closure therefor movable in at least two planes, a closure seat slidably mounted about the flow port and normally resiliently urged against said closure, sealant sealing faces disposed between said closure and seat, a first sealant reservoir in communication with said faces, a second sealant reservoir, passage means connecting said reservoirs, means in the closed position of the valve responsive to line pressure to impart sliding motion to said seat in one direction whereby sealant is forced from said first reservoir to said sealant sealing faces and means in the valve open position imparting a reverse motion to said slidable seat and means whereby sealant will be forced from the second reservoir to said first reservoir.

19. A valve including a housing having a flowway therethrough, a closure member in the housing intersecting the flowway and arranged for limited lateral movement parallel thereto, a closure seat member slidably disposed about said flowway, a portion of said seat member cooperating with an adjacent housing portion to define therewith an expansible sealant reservoir, a sealant groove arranged between the closure member and the seat member about the flowway, passage means communicating said reservoir with said sealant groove, means biasing the seat member toward the closure member and in the reservoir-expanding direction, said seat member and said closure member when the latter is in flowway-closing position forming means operable in response to upstream line pressure to move said seat member in the reservoir-contracting direction whereby to force sealant from said reservoir to said sealant groove, and a second sealant reservoir in said housing communicating with said expansible reservoir, said second sealant reservoir having means responsive to line pressure phen said closure member is moved to flowway-opening position to automatically deliver sealant to said expansible reservoir.

References Cited

UNITED STATES PATENTS

| 2,951,497 | 9/1960 | Laurent | 137—246.22 X |
| 3,181,552 | 5/1965 | Jackson | 137—246.12 |
| 3,280,835 | 10/1966 | Hill | 137—246.12 X |

FOREIGN PATENTS 632,151  12/1961  Canada.

CLARENCE R. GORDON, *Primary Examiner.*